(12) United States Patent
Watanabe et al.

(10) Patent No.: US 6,763,743 B2
(45) Date of Patent: Jul. 20, 2004

(54) FLYWHEEL DEVICE FOR PRIME MOVER

(75) Inventors: Naoto Watanabe, Saitama-ken (JP); Shuji Ichijo, Saitama-ken (JP); Makoto Sumi, Saitama-ken (JP); Hiroshi Saotome, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/123,227

(22) Filed: Apr. 17, 2002

(65) Prior Publication Data

US 2002/0170380 A1 Nov. 21, 2002

(30) Foreign Application Priority Data

May 17, 2001 (JP) ........................................ 2001-148441

(51) Int. Cl.[7] .......................... F16F 15/10; F16D 13/68; G05G 1/00; G05G 3/00
(52) U.S. Cl. .......................... 74/574; 74/572; 74/573 F; 192/70.17; 192/30 V
(58) Field of Search .................... 74/572–574; 475/347; 464/24; 192/70.17, 55.1, 205, 30 V

(56) References Cited

U.S. PATENT DOCUMENTS

| 5,733,218 | A | * | 3/1998 | Sudau et al. ................. 475/347 |
| 5,778,838 | A | * | 7/1998 | Takabayashi et al. .......... 74/574 |
| 5,863,274 | A | * | 1/1999 | Jackel ........................ 475/347 |
| 5,944,610 | A | * | 8/1999 | Sudau .......................... 464/24 |
| 6,003,650 | A | * | 12/1999 | Kleifges ................... 192/70.17 |
| 6,058,801 | A | * | 5/2000 | Schierling et al. ......... 74/573 F |
| 6,058,802 | A | * | 5/2000 | Sudau et al. .............. 74/573 F |
| 6,167,999 | B1 | * | 1/2001 | Reik et al. ................. 192/55.1 |
| 6,247,571 | B1 | * | 6/2001 | Nakane et al. .............. 192/205 |

FOREIGN PATENT DOCUMENTS

JP            51-12273         3/1982

* cited by examiner

Primary Examiner—Vinh T. Luong
(74) Attorney, Agent, or Firm—Armstrong, Kratz, Quintos, Hanson & Brooks, LLP

(57) ABSTRACT

A flywheel device for a prime mover can be made compact in axial size and has an effectively increased inertial mass. The flywheel device includes a drive plate and a mass ring. The drive plate has an annular projection and is attached to a crankshaft concentric with the crankshaft. The mass ring has an annular recess and is concentrically attached to the drive plate by the annular recess being fitted on the annular projection of the drive plate. The flywheel device transmits torque from an engine as the prime mover to the input shaft of an automatic transmission while reducing variation in the torque.

9 Claims, 7 Drawing Sheets

FLYWHEEL DEVICE FOR PRIME MOVER

BACKGROUND OF THE INVENTION

1. Field of the Invention

This invention relates to a flywheel device for a prime mover, such as a flywheel having a torsional vibration damper for use with a vehicle driving system, which is capable of transmitting torque from the prime mover while reducing variation in the torque and damping torsional vibration.

2. Description of the Prior Art

Conventionally, a flywheel device of the above-mentioned kind has been proposed e.g. by Japanese Utility Model Registration Publication (Kokoku) No. 5712273. This flywheel device is comprised of a flywheel body and a torsional vibration damper (hereinafter referred to as "the torsional damper") which are assembled into a unit. The flywheel device is arranged between the engine and the clutch. The flywheel body includes a disc-shaped base portion, and a protrusion which protrudes toward the clutch from an outer peripheral end of the base portion. The base portion has an engine crankshaft mounted in a central portion thereof, and a bearing fitted in a central portion of a clutch-side end thereof, for rotatably supporting an input shaft of the clutch.

The torsional damper is comprised of a hub splined to the input shaft of the clutch, two plates integrally fixed to each other in a state holding a flange portion extending radially outward from the hub, coil springs received between the two plates for damping torsional vibration, and grease. Further, one of the plates has a radial outer end rigidly fixed to the protrusion of the flywheel body by a plurality of bolts. The construction described above causes torque from the engine to be transmitted to the input shaft of the clutch via the flywheel body and the torsional damper. In the transmission process, the flywheel body reduces variation in the torque, and the torsional damper damps torsional vibration.

According to the above conventional flywheel device, since the bearing is fitted in the flywheel body, the central portion of the flywheel body is required to be thick enough to receive the bearing therein, and further, since one of the plates of the torsional damper is fixed to the protrusion protruding toward the clutch, the axial size of the whole flywheel device is inevitably increased.

SUMMARY OF THE INVENTION

It is an object of the invention to provide a flywheel device for a prime mover, which can be made compact in the axial size thereof and have an effectively increased inertial mass.

To attain the above object, the present invention provides a flywheel device for a prime mover, which is arranged between an output shaft and a driven shaft of the prime mover, the flywheel device comprising:
a plate having a fitting portion in a radially outer portion thereof and mounted to the output shaft in a manner concentric therewith; and
an inertial mass member having an annular shape, the inertial mass member having a fitting portion which is fitted to the fitting portion of the plate, whereby the inertial mass member is concentrically attached to the plate, for transmitting torque from the prime mover to the driven shaft while reducing variation in the torque.

According to this flywheel device, the inertial mass member transmits torque from the prime mover to the driven shaft while reducing variation in the torque. Further, the plate is mounted to the output shaft in a manner concentric therewith, and the inertial mass member has an annular shape and is concentrically attached to the plate via the fitting portion thereof which is fitted to the fitting portion in the radially outer portion of the plate. The inertial mass member is thus centered with respect to the output shaft simply by fitting the fitting portion of the inertial mass member and the fitting portion of the plate to each other. This makes it possible to center the inertial mass member with ease and accuracy when the flywheel device is attached to the output shaft. Further, since the inertial mass member annular in shape is attached to the radially outer portion of the plate, it is possible to effectively increase the inertial mass of the flywheel device and at the same time make the whole device compact in axial size. This makes it possible to attain reduction of the total weight of the inertial mass member and the plate and securing of the inertial mass and the moment of inertia, in a properly balanced manner. Further, since a member corresponding to the conventional flywheel body is formed by assembling the two components of the inertial mass member and the plate, it is possible to increase the freedom of arrangement thereof in comparison with the conventional flywheel body.

Preferably, the flywheel device further comprises a linkage connecting between a portion of the inertial mass member radially inward of the fitting portion thereof and the driven shaft, and a damping mechanism arranged in the linkage, for transmitting the torque from the prime mover to the driven shaft while damping torsional vibration thereof.

According to this preferred embodiment, the torque from the prime mover is transmitted to the driven shaft via the plate, the inertial mass member, the linkage, and the damping mechanism while the damping mechanism damping torsional vibration. Further, the damping mechanism is arranged in the linkage which is connected to the portion of the inertial mass member radially inward of the fitting portion. Therefore, the fitting portion of the inertial mass member and the damping mechanism are prevented from being axially arranged side by side, thereby making it possible to make the whole device more compact in axial size. Furthermore, the fitting portion of the inertial mass member is arranged at a location outward of the linkage and the damping mechanism, so that the fitting portion can be formed in a simplified manner without being adversely affected by the constructions and shapes of the linkage and the damping mechanism or being obstructed by them.

Preferably, the damping mechanism comprises at least one coil spring, and the linkage includes a pair of spring holder plates for holding the at least one coil spring in a spring chamber formed therebetween.

According to this preferred embodiment, it is possible to damp the torsional vibration occurring when torque from the prime mover is transmitted to the driven shaft, by using the at least one coil spring which is a relatively simple and easily available component. Further, the same effects as described above can be obtained by the relatively simple construction that the at least one coil spring is accommodated in the spring chamber formed between the pair of spring holder plates.

More preferably, the damping mechanism further comprises a pair of friction discs each having a predetermined coefficient of kinetic friction, grease contained in the spring chamber and having a predetermined coefficient of viscosity, the at least one coil spring having a predetermined spring modulus, and the predetermined coefficient of kinetic friction of each friction disc, the coefficient of viscosity of the grease, and the spring modulus of each coil spring are selected such that a rotational vibration system including the primer mover and the driven shaft has a resonance frequency which is outside a range of values thereof corresponding to a predetermined rotational speed region of the prime mover.

Further preferably, the at least one coil spring comprises at least two kinds of coil springs arranged such that the at least two kinds of coil springs start to be compressed at respective relative rotational angles of the output shaft to the driven shaft.

Further preferably, the grease fills part of a volume of the spring chamber.

The above and other objects, features, and advantages of the invention will become more apparent from the following detailed description taken in conjunction with the accompanying drawings.

DETAILED DESCRIPTION OF A PREFERRED EMBODIMENT

Figure 1:
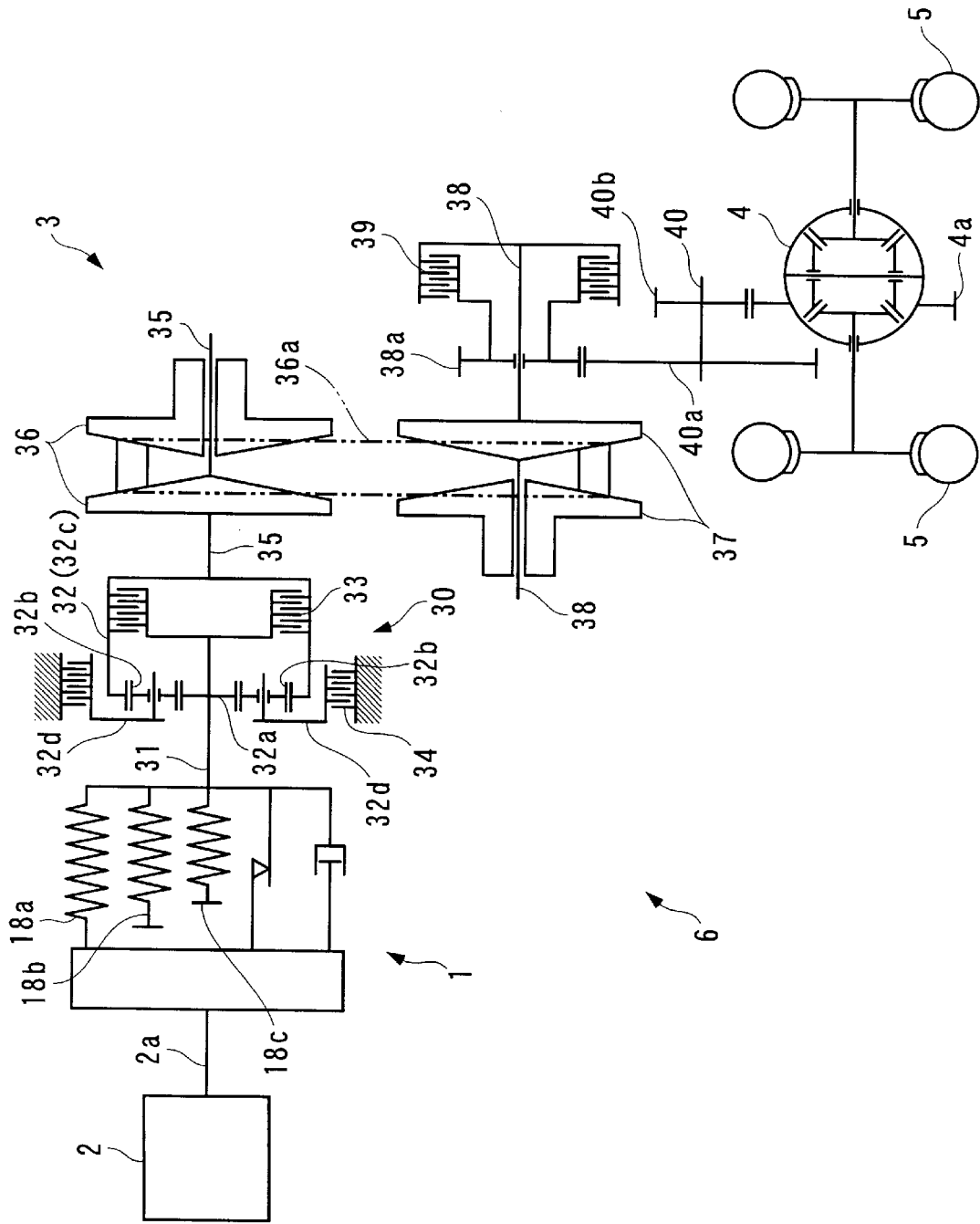
FIG. 1 is a block diagram schematically showing the arrangement of a vehicle driving system to which is applied a flywheel device according to an embodiment of the invention.

The invention will now be described in detail with reference to the drawings showing a preferred embodiment thereof. Referring first to FIG. 1, there is schematically shown the arrangement of a vehicle driving system to which is applied a flywheel device for a prime mover, according to the preferred embodiment of the present invention. As shown in the figure, in the vehicle driving system 6, an engine 2 as a prime mover is connected to driving wheels 5, 5 via the flywheel device 1, an automatic transmission 3, a differential gear mechanism 4, and the like, which enables torque from the engine 2 to be transmitted to the driving wheels 5, 5.

Figure 2:
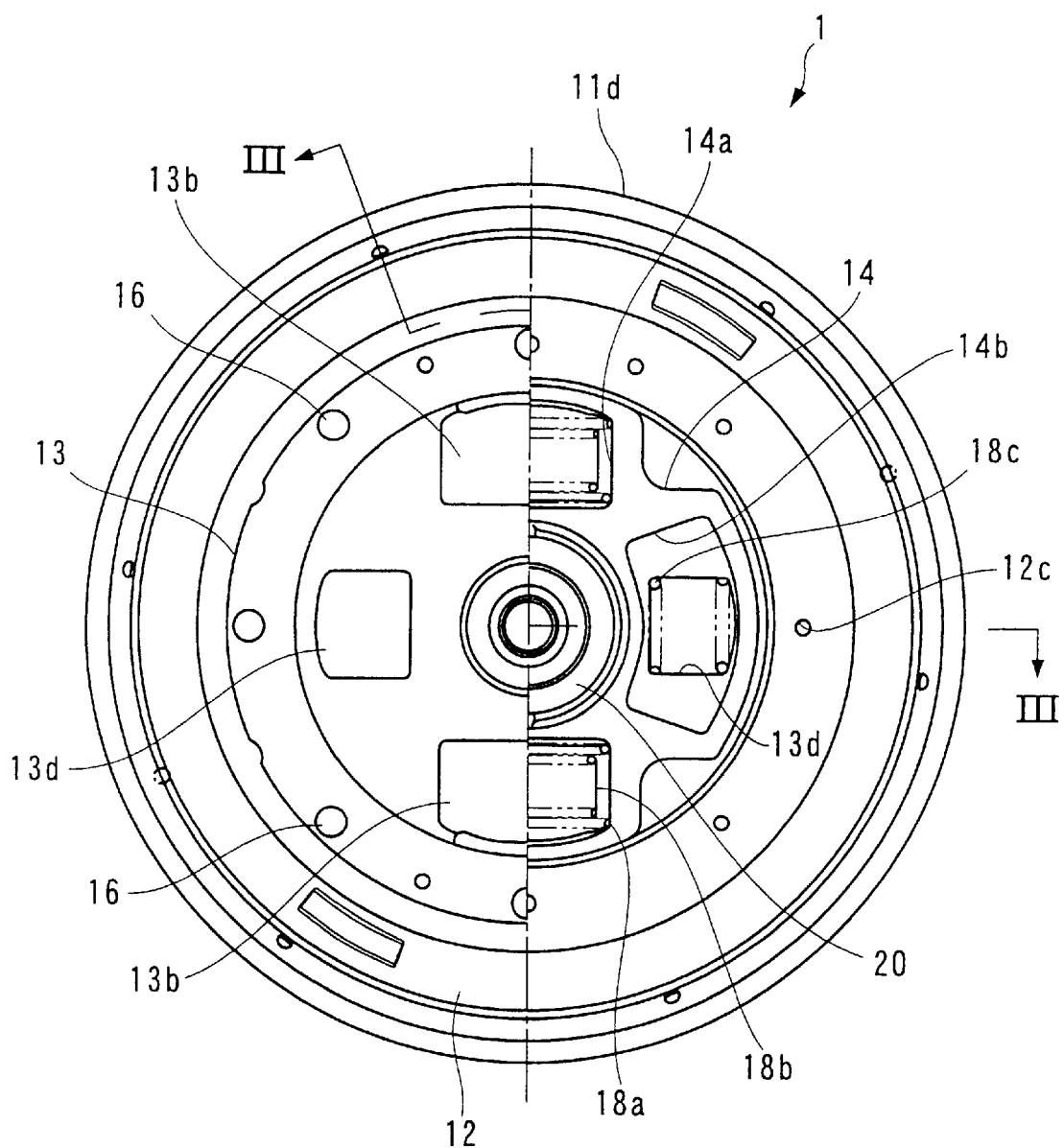
FIG. 2 is an elevational view of the flywheel device with a one-side cross section, as viewed from the front side thereof.
Figure 3:
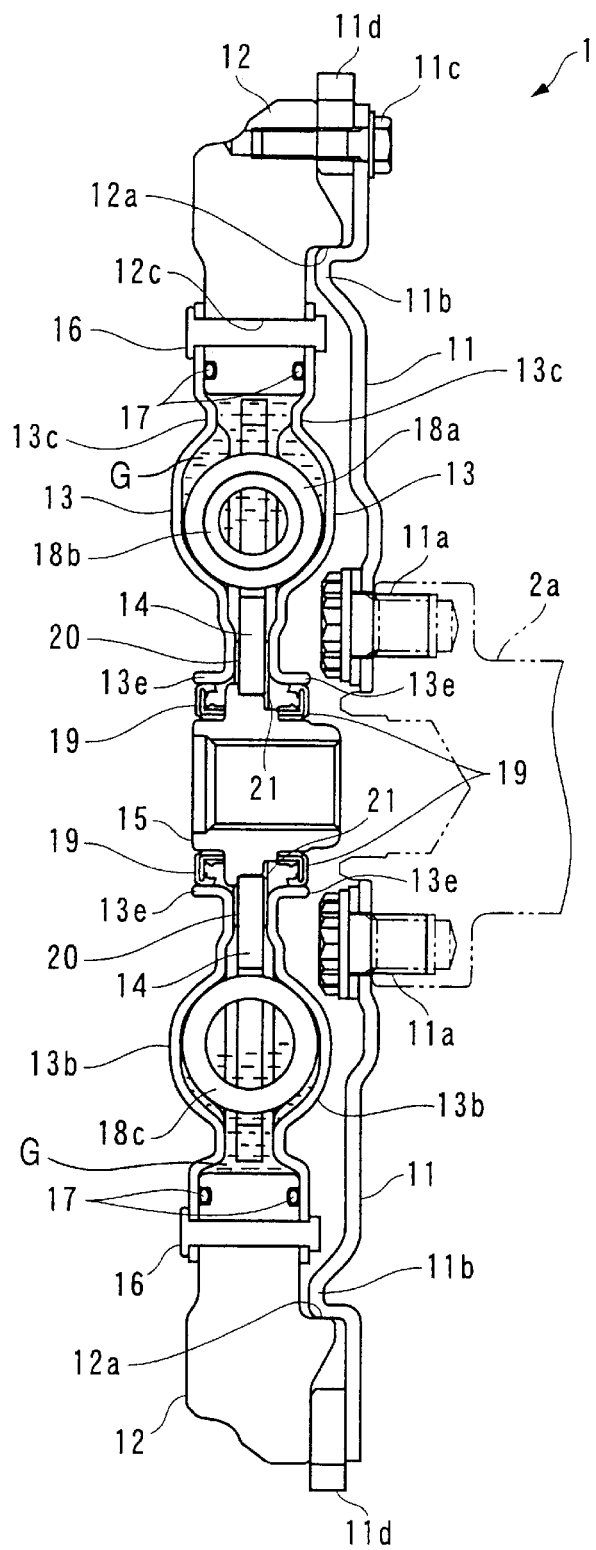
FIG. 3 is a sectional view taken on line III—III of FIG. 2.

The flywheel device 1 is arranged between the engine 2 and the automatic transmission 3, and transmits torque from the engine 2 to the automatic transmission 3 while reducing engine torque variation and damping torsional vibration. As shown in FIGS. 2 and 3, the flywheel device 1 is comprised of a drive plate 11, a mass ring 12, a pair of spring holder plates 13, 13, a driven plate 14, and a boss 15.

The drive plate 11 (plate) is a disc made of steel with an opening formed in a central portion thereof. The inner peripheral portion of the drive plate 11 defining the opening is rigidly fixed to the end portion of the crankshaft 2a of the engine 2 by a plurality of bolts 11a (only two of which are shown in FIG. 3). Thus, the drive plate 11 is mounted to the crankshaft 2a in a manner concentric therewith. Further, the drive plate 11 has an annular projection 11b continuously formed in a manner concentric with the crankshaft on a portion close to the outer periphery thereof. The annular projection 11b (fitting portion) projects toward the mass ring 12 for being fitted into an annular recess 12a, referred to hereinafter, of the mass ring 12.

Further, the drive plate 11 has a radially outer end portion (outer peripheral portion) thereof fixed to the mass ring 12 by six bolts (only one of which is shown in FIG. 3). Arranged between the drive plate 11 and the mass ring 12 is a ring gear lid which is driven for rotation by a starter, not shown, when the engine 2 is started. The ring gear 11d, the drive plate 11 and the mass ring 12 are fastened together by the same bolts 11c.

The mass ring 12 (inertial mass member) is formed to have an annular shape by cutting cast iron, and has an inertial mass required for reducing variation in torque from the engine 2. The mass ring 12 has the annular recess 12a (fitting portion) continuously formed in a manner concentric with the crankshaft at a predetermined location in a drive plate-side surface thereof. The annular recess 12a and the annular projection 11b are engaged with each other, whereby the mass ring 12 is mounted on the crankshaft 2a via the drive plate 11 in a state centered with respect to the crankshaft 2a.

Further, attached to the radially inner end portion (inner peripheral portion) of the mass ring 12 are the radially outer end portions (outer peripheral portions) of a pair of spring holder plates 13, 13 in an axially opposed arrangement. Both of the spring holder plates 13, 13 (linkage) are identical in shape and size and are made from a metal plate (steel plate, for instance) by press working. This makes it possible to produce the spring holder plates 13, 13 by using the same press die, thereby reducing the manufacturing costs thereof.

The spring holder plate 13 is attached to the mass ring 12 by eight rivets 16. Each rivet 16 is inserted through a rivet hole 12c formed through the mass ring 12, and rivet holes 13a, 13a (see FIG. 4) formed through the holder plates 13, 13, and have its end riveted. Thus, each spring holder plate 13 is firmly fixed to the mass ring 12. Further, each rivet hole 12c is formed at a location radially outward of the inner end (inner periphery) of the mass ring 12 at a predetermined distance therefrom. This makes it possible to secure the strength of the mass ring 12 against high speed rotation.

Further, the mass ring 12 has two annular grooves formed on opposite sides of the mass ring 12, at locations inward of the rivet holes 12c, for having O rings 17, 17, fitted therein, respectively. Due to provision of the O rings 17, 17 at the locations inward of the rivet holes 12c, the interface between the mass ring 12 and the spring holder plates 13, 13 is held in a liquid-tight state and a grease chamber, referred to hereinafter, is held in a liquid-tight state.

Figure 4:
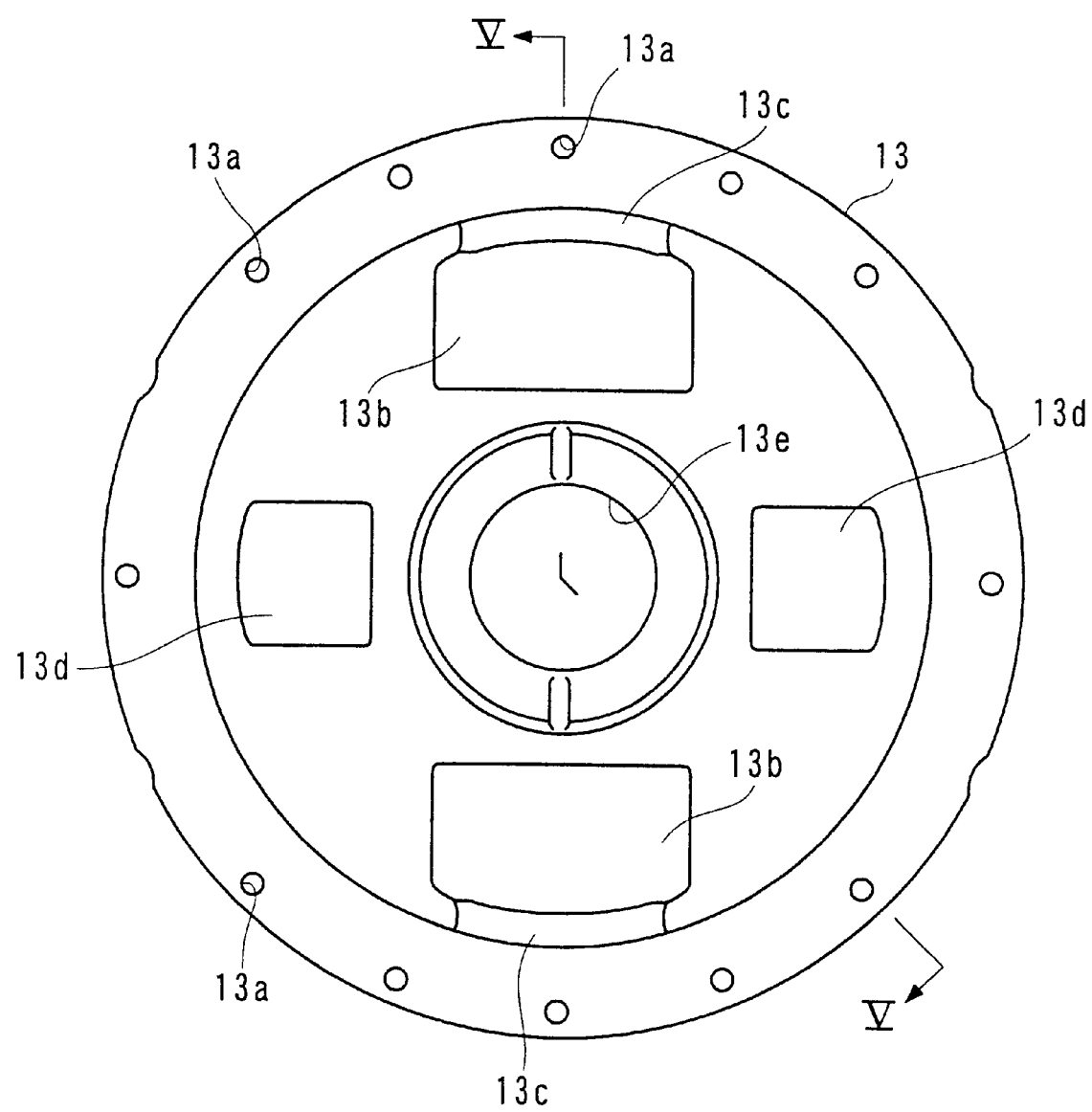
FIG. 4 is a rear view showing a spring holder plate.

Referring to FIG. 4, each spring holder plate 13 has four spring chamber portions 13b, 13b, 13d, 13d alternately arranged at circumferentially 90-degree intervals. A pair of associated large spring chamber portions 13b, 13b form a large spring chamber, as shown in FIG. 3, which accommodates a first coil spring 18a and a second coil spring 18b inside the first coil spring 18a.

The first coil spring 18a is held by the holder plate 13, 13 in a state in which the opposite ends and outer peripheral surface thereof are in contact with the walls of the pair of large spring chamber portions 13b, 13b. The second coil spring 18b is shorter in length than the first coil spring 18a, and accommodated in the large spring chamber with opposite ends thereof spaced from the wall of each large spring chamber portion 13b by a predetermined distance when the second coil spring 18b is not compressed.

Figure 5:
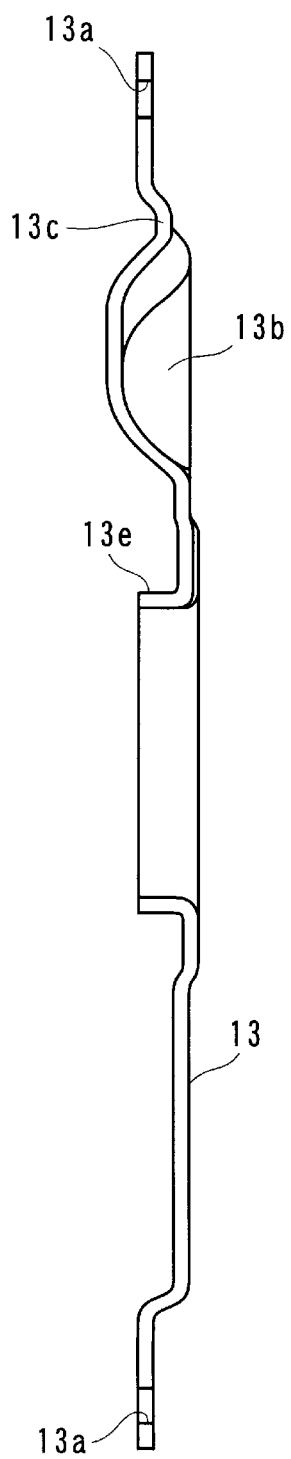
FIG. 5 is a sectional view taken on line V—V of FIG. 4.

Further, the large spring chamber portion 13b has a radially outer end portion 13c smaller in drawing degree than a radially inner end portion (see FIG. 5) thereof. This is for the following reason: In the spring holder plate 13, the large spring chamber portion 13b is formed by drawing to a larger degree than the other portions so as to receive the first coil spring 18a. In addition, the outer end portion (peripheral portion) of the spring holder plate 13 is located axially outward with respect to a portion closer to the inner peripheral portion of the same, and the large spring chamber portion 13b is provided in the vicinity of the outer peripheral portion. Therefore, if the outer end portion 13c of the large spring chamber portion 13b is desired to be drawn to the same axial position as that of the inner end portion, it is difficult not only to carry out the drawing process since the drawing degree of the outer end portion 13c becomes very large but also to secure strength of the outer end portion. In view of the above, in the present embodiment, the outer end portion 13c is formed as described above whereby the ease of drawing of the large spring chamber portion 13b and the strength of the outer end portion 13c are ensured.

Further, each small spring chamber is formed by a pair of associated small spring chamber portions 13d, 13d for accommodating a third coil spring 18c. Each of the third coil springs 18c is held by the spring holder plates 13, 13 in a state in which the opposite ends and outer peripheral surface thereof are in contact with the walls of the pair of small spring chamber portions 13d, 13d.

As described hereinabove, the first to third coil springs 18a to 18c are held by the spring holder plates 13, 13. This is for the following reason: If the first to third coil springs 18a to 18c are held by the driven plate 14, it is required to form a chamber larger than the spring chamber portion 13b or 13d by a drawing process so as to define start/end positions at which the first to third coil springs 18a to 18c start or terminate compression or expansion in accordance with the rotation of the crankshaft 2a. This makes it more difficult to work on the spring holder plates 13, 13, resulting in increased manufacturing costs of the device. Therefore, in the flywheel device 1, to the end described above, holes 14a, 14b, referred to hereinafter, are formed in the driven plate 14, for receiving the first and third coil springs, thereby reducing manufacturing costs of the flywheel device.

Furthermore, the radially inner end (inner peripheral portion) of the spring holder plates 13, 13 is formed with a flange portion 13e protruding axially outward. Arranged between the flange portion 13e and the boss 15 is an oil seal 19 to thereby maintain the interface between the flange portion 13e and the boss 15 in a liquid-tight state.

By the configuration described above, a grease chamber is defined by the mass ring 12, the spring holder plates 13, 13, and the boss 15. The grease chamber is held in a liquid-tight state by the oil seal 19 and the O rings 17, 17, and is filled with grease to such a predetermined extent (percentage) as will not fully fill the grease chamber (e.g. to 50% of a rated value of the volume of the chamber). This is because if the grease chamber is filled with the grease to the above predetermined extent, it is possible not only to prevent leakage of the grease which might be caused by variations in the volume of the grease chamber formed by press working of a metal plate if the grease chamber is fully filled with the grease, but also to provide the following functions which work in a manner comparable to the case of the grease chamber being fully filled with the grease.

More specifically, the grease filling the grease chamber to the predetermined extent acts to offer a viscous resistance when the torque from the engine 2 is transmitted to the automatic transmission 3 via the flywheel device 1, whereby the grease contributes to damping of torsional vibration and reduction of noises generated during the operations of the first to third coil springs 18a to 18c and the driven plate 14.

Further, the grease is applied in advance onto a contact surface of the oil seal 19 in contact with the flange portion 13e, as lip grease (grease applied onto the lip of an oil seal) for securing the durability of the oil seal 19 to initial abrasion. Further, grease identical to the above grease is also applied onto the contact surfaces of friction discs 20, 21, referred to hereinafter. The same grease is thus commonly used for application onto the friction discs 20, 21 and for filling the grease chamber, whereby it is possible to prevent changes in kinetic frictional characteristics on the contact surfaces of the friction discs 20, 21.

The boss 15 is coaxially fixed to an end of the input shaft 31 of the automatic transmission 3. The input shaft 31 (driven shaft) is rotatably supported by a bearing, not shown, in a state centered with respect to the crankshaft 2a.

Further, the boss 15 has a central portion of an outer peripheral surface thereof integrally and coaxially fixed to the driven plate 14 by welding. The driven plate 14 is formed with a pair of the above-mentioned holes 14a, 14a for accommodating the first coil springs, and a pair of the above-mentioned holes 14b, 14b for accommodating the third coil springs. The first coil spring 18a described above is arranged in the first coil spring-accommodating hole 14a with ends thereof being in abutment with opposed end walls of the holes 14a. The first coil spring-accommodating hole 14a defines angle positions at which the first coil spring 18a and the second coil spring 18b start to be compressed, respectively, as the crankshaft 2a starts to rotate relative to the input shaft 31.

The above-mentioned third coil spring 18c is arranged in the third coil spring-accommodating hole 14b in a state in which the opposite ends of the third coil spring 18 are spaced from the opposite edges of the hole 14b by a predetermined space to keep away from contact therewith when the flywheel device 1 is in a non-operative state (stopped state). The third coil spring-accommodating hole 14b defines an angle position at which the third coil spring 18c starts to be compressed in accordance with the start of rotation of the crankshaft 2a.

Further, the spring holder plates 13, 13, have flexibility and hold the two friction discs 20, 21 between radially inner end portions (inner peripheral portions) thereof and the driven plate 14 in a sandwiching manner. As described above, it is possible to hold the friction discs 20, 21 between the respective spring holder plates 13, 13, and the driven plate 14 by using the urging forces of the spring holder plates 13, 13, and hence the manufacturing costs of the flywheel device can be reduced since it is possible to dispense with a disc spring used in the conventional device.

The friction discs 20, 21 are each used for restricting torsional vibration by kinetic friction resistance thereof, and as described hereinafter, the same is mainly used for restricting torsional vibration generated when engine torque starts to be transmitted from the engine 2 to the automatic transmission 3. Since the two friction discs 20, 21 are substantially similarly configured, the friction disc 20 will be described by way of example.

Figure 7A:
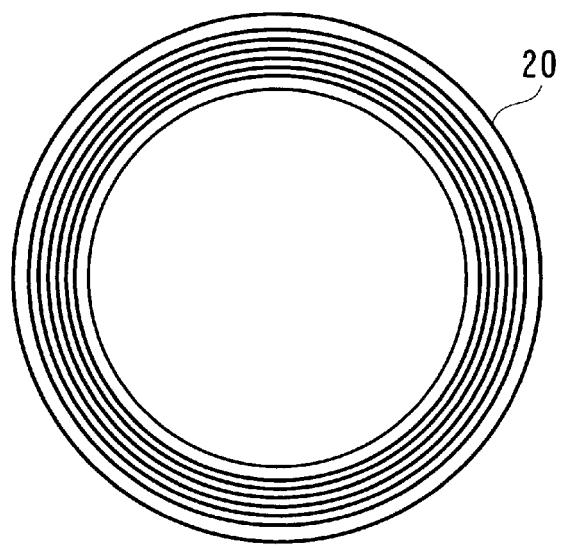
FIG. 7A is a plan view showing a friction disc.
Figure 7B:
FIG. 7B is a cross-sectional view showing the friction disc.
Figure 7C:
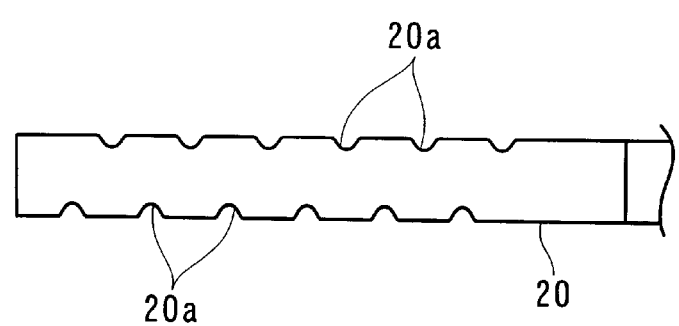
FIG. 7C is an enlarged cross-sectional view showing part of the FIG. 7B friction disc on an enlarged scale.

As shown in FIGS. 7A to 7C, the friction disc 20 is formed by an annular and thin synthetic resin plate having a large number of annular grooves 20a concentrically formed in the front and back surfaces thereof. The annular grooves 20a are alternately formed in the front and back surfaces such that the radial position of a groove 20a in one of the front and back surfaces corresponds to a location between two respective grooves 20a, 20a adjacent to each other in the other of the surfaces (see FIG. 7C).

The annular grooves 20a formed as above make it possible to reduce the rate at which the fluctuation of friction torque which is transmitted from the holder plate 13 to the driven plate 14 via the friction disc 20 in accordance with the variation of load of the spring holder plate 13 acting on the friction disc 20. Consequently, even when the load acting in the friction disc 20 is varied, it is possible to restrict the variation in the friction torque. Further, since the annular grooves 20a are alternately arranged on the front and back surfaces of the friction disc 20, it is possible to obtain the above effect of suppressing the variation in the friction torque and at the same time maintain the durability of the friction disc 20 formed by the thin synthetic resin plate. The friction disc 20 is configured as described above, and the friction disc 21 is also configured similarly to the friction disc 20.

Figure 6:
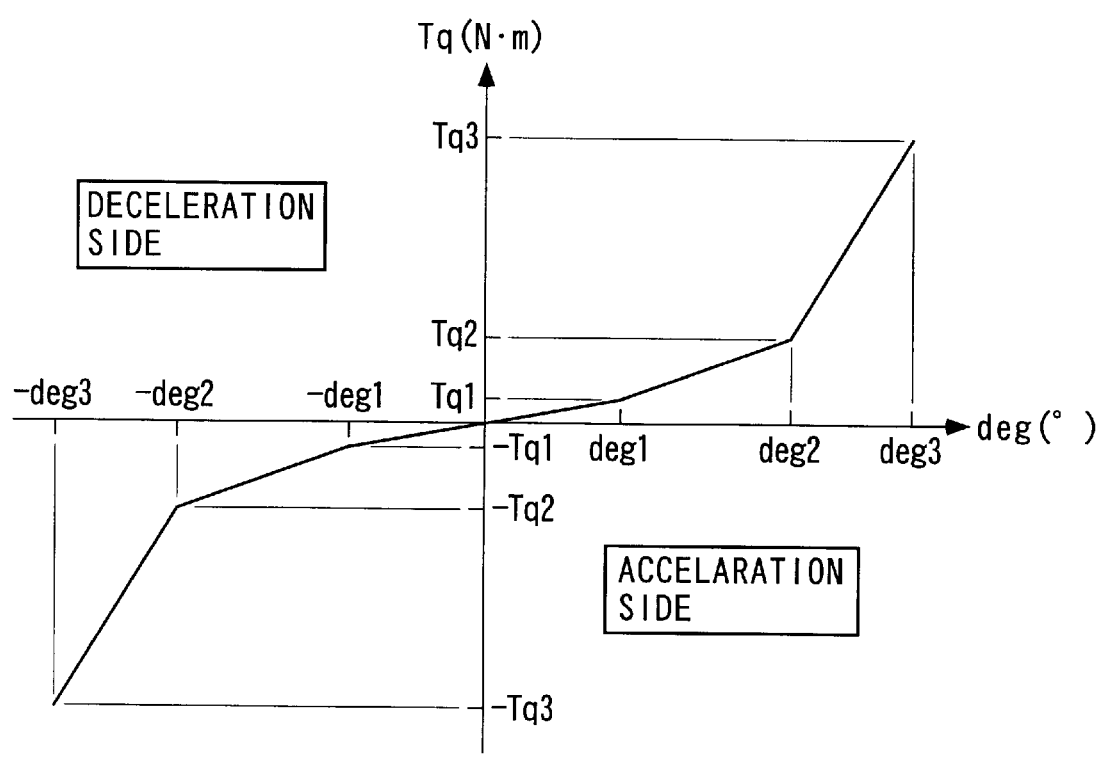
FIG. 6 is a graph showing an example of the static torsional characteristics of the flywheel device.

Further, as described hereinabove, the flywheel device 1 includes three types of coil springs, that is, the first to third coil spring 18a to 18c, which provides the flywheel device 1 with static torsional characteristics, an example of which is illustrated in FIG. 6. The figure shows a characteristic curve illustrating the relationship between the relative rotational angle deg of the spring holder plate 13 with respect to the driven plate 14 formed when the spring holder plate 13 is rotated relative to the driven plate 14, and torque Tq required for rotating the spring holder plate 13. As shown in the figure, the static torsional characteristics on an acceleration side and a deceleration side are identical to each other except that they are opposite in the sign. In the following, a characteristic curve on the acceleration side is described by way of example.

The characteristic curve on the acceleration side shows that the torque Tq assumes a larger value as the rotational angle deg becomes larger, and the slope of the curve indicative of the torque Tq undergoes change in three stages (corresponding to three straight line segments). More specifically, in a first stage in which the rotational angle deg of the crankshaft 2a is within a range of $0 \leq \text{deg} < \text{deg}1$, the torque Tq assumes a value within a range of $0 \leq \text{Tq} < \text{Tq}1$ since the urging forces of two first coil springs 18a, 18a act on the torque Tq. The slope of a line segment indicative of the torque Tq in the first stage is set to be smaller than those of respective line segments indicative of the torque Tq in second and third stages. This is for the following reason:

In the vehicle driving system 6 described above, when a forward clutch 33 or a reverse brake 34 is connected during the start of the vehicle, the crankshaft 2a of the engine 2 is connected to the automatic transmission 3 via the flywheel device 1. Hence, an inertial mass downstream of the flywheel device 1 is increased, whereby the resonance frequency of a rotational vibration system from the engine 2 to the automatic transmission 3 or the driving wheels 5, 5 is reduced, while the amplitude of the rotational vibration is increased when it is in a resonance region of the rotational vibration system. Therefore, if the resonance frequency is within a range of values thereof corresponding to a region of the idling engine rotational speed, vibrations with an increased amplitude are generated by the resonance of the rotational vibration system, resulting in the reduced marketability of the vehicle. Particularly, the resonance of the rotational vibration system during the start of the vehicle should be resolved with the highest priority since it is liable to cause discomfort of the driver. Therefore, to cope with the problem of the resonance, the coefficient of kinetic friction of each of the friction discs 20, 21, the coefficient of viscosity of grease, and the spring modulus of each of the two first coil springs 18a, 18a are properly set in advance, respectively, such that when a starting clutch 39 is in an OFF state, and an accelerator pedal, not shown, is not stepped on, the resonance frequency of a rotational vibration system from the engine 2 to the starting clutch 39 is higher than a range of values thereof corresponding to the region of the idling engine rotational speed, whereas when the starting clutch 39 is in the ON state, and the accelerator pedal is not stepped on, the resonance frequency of the rotational vibration system from the engine 2 to the driving wheels 5, 5 is smaller than the range of values corresponding to the region of the idling engine speed. To be adapted to this, the first coil springs 18a are set such that the slope of the line segment indicative of the torque Tq in the first stage assume the smaller value, as described above.

Further, in the second stage in which the rotational angle deg of the crankshaft 2a is within a range of $\text{deg}1 \leq \text{deg} < \text{deg}2$, the urging forces of the two first coil springs 18a, 18a as well as the two second coil springs 18b, 18b come to act, whereby the torque Tq assumes a value within a range of $\text{Tq}1 \leq \text{Tq} < \text{Tq}2$. The slope of a line segment indicative of the torque Tq in this stage is made larger than that in the first stage. Further, the slope of the line segment indicative of the torque Tq in this stage is set such that it is possible to reduce vibrations and noises in the vehicle compartment which are generated during travel of the vehicle in a manner dependent on vehicle weight and engine torque.

Furthermore, in the third stage in which the rotational angle deg of the crankshaft 2a is within a range of $\text{deg}2 \leq \text{deg} \leq \text{deg}3$, the urging forces of the six coil springs, i.e. the first to third coil springs 18a to 18c come to act, whereby the torque Tq assumes a value within a range of $\text{Tq}2 \leq \text{Tq} \leq \text{Tq}3$. The slope of a line segment indicative of the torque Tq in the third stage is set to be larger than those in the first and the second stages.

The automatic transmission 3 is a continuously variable transmission of a belt CVT type, which is comprised of a forward/backward travel-switching mechanism 30, a main shaft 35, a drive pulley 36, a driven pulley 37, a counter shaft 38, the starting clutch 39, and so forth.

The forward/backward travel-switching mechanism 30 includes the above input shaft 31 connected to the boss 15 of the flywheel device 1, and a planetary gear device 32 mounted to the input shaft 31. The planetary gear device 32 is of a single planetary pinion gear type, which is characterized in that it generates smaller noises during operation due to a smaller number of gears in mesh with each other than the number of gears of a double planetary pinion gear type. The planetary gear device 32 is comprised of a sun gear 32a, a plurality of (e.g. four) single planetary pinion gears 32b, a ring gear 32c, and a planetary carrier 32d.

The sun gear 32a is coaxially mounted on the input shaft 31. The input shaft 31 has an end thereof on a downstream side with respect to the sun gear 32a, connected to the ring gear 32c via the forward clutch 33. When turned on by a control device, not shown, the forward clutch 33 connects the input shaft 31 and the ring gear 32c of the planetary gear device 32, whereas when turned off, the forward clutch 33 disconnects them. Further, the planetary carrier 32d is connected to the reverse brake 34 which locks the planetary carrier 32d when it is turned on by the control device.

The ring gear 32c is coaxially fixed to the main shaft 35. Further, the plurality of single planetary pinion gears 32b are rotatably attached to the planetary carrier 32d, and interposed between the sun gear 32a and the ring gear 32c for always being meshed therewith.

According to the automatic transmission 3 constructed as above, in the forward/backward travel-switching mechanism 30, when the forward clutch 33 is turned on with the reverse brake 34 being held in the OFF state, the input shaft 31 and the main shaft 35 are directly connected to each other to directly transmit the rotation of the input shaft 31 to the main shaft 35. When the vehicle is moved forward, the main shaft 35 thus rotates in the same direction as the input shaft 31 does. On the other hand, if the reverse brake 34 is turned on with the forward clutch 33 being held in the OFF state, the planetary carrier 32d is locked, whereby the rotation of the input shaft 31 is transmitted to the main shaft 35, by reversing the direction of rotation, via the sun gear 32a, the plurality of planetary pinion gears 32b, and the ring gear 32c. When the vehicle is moved backward, the main shaft 35 thus rotates in a direction opposite to the direction of rotation of the input shaft 31.

Further, the drive pulley 36 is coaxially attached to the main shaft 35, and rotates in unison therewith. The driven pulley 37 is coaxially mounted on the counter shaft 38, and rotates in unison therewith. Between the drive pulley 36 and the driven pulley 37 is stretched a metal belt 36a. The pulleys 36, 37 are connected to a pulley width variable mechanism, not shown. The pulley width variable mechanism varies the widths of the pulleys 36, 37, respectively, to thereby continuously change the ratio between the rotational speed of the main shaft 35 and that of the counter shaft 38. Thus, the shift operation is continuously or steplessly carried out.

Further, the starting clutch 39 is used for connecting and disconnecting an idle gear 38a coaxially and rotatably arranged on the counter shaft 38 to and from an end of the counter shaft 38. When turned on by the control device, the starting clutch 39 connects the idle gear 38a and the counter shaft 38 to each other.

The idle gear 38a is in mesh with a large gear 40a on an idle shaft 40. The large gear 40a and a small gear 40b are coaxially and integrally formed with the idle shaft 40. The small gear 40b is meshed with the gear 4a of the differential gear mechanism 4. The construction described above causes the rotation of the driven pulley 37 to be transmitted to the driving wheels 5, 5 when the starting clutch 39 is turned on.

Next, the operation of the vehicle driving system 6 constructed as above will be described. First, when the accelerator pedal is not stepped on so that the engine 2 is idling in a standing state of the vehicle, and a shift lever, not shown, being in a neutral range or in a parking range, the forward clutch 33, the reverse brake 34, and the starting clutch 39 are all held in the OFF state. This causes the torque from the engine 2 to be transmitted to the input shaft 31 of the automatic transmission 3 via the flywheel device 1. The engine torque is also transmitted in a small amount to the drive pulley 37 side via the planetary gear device 32 through small rotational resistances generated between the gears of the planetary gear device 32.

In the above transmission process, the flywheel device 1 contributes to damping torsional vibration as well as reducing torque variation. Especially, the coefficient of kinetic friction of each of the friction discs 20, 21, the coefficient of viscosity of grease, and the spring modulus of each of the first coil springs 18a, 18a of the flywheel device 1 are set as described hereinabove, whereby when the starting clutch 39 is in the OFF state, the resonance frequency of the rotational vibration system from the engine 2 to the starting clutch 39 is made larger than the range of values thereof corresponding to the region of the idling engine speed. This prevents occurrence of the resonance in an idle operating region of the engine in which the engine 2 is idling with the accelerator pedal not being stepped, thereby ensuring the excellent marketability of the vehicle.

From the above standing state of the vehicle, when the shift lever is moved by the driver to a drive range, the forward clutch 33 is turned on with the reverse brake 34 being in the OFF state, to thereby connect the input shaft 31 and the main shaft to each other. This causes the torque from the engine 2 to be transmitted to the starting clutch 39 via the flywheel device 1, the input shaft 31, the main shaft 35, the drive pulley 36, and the driven pulley 37.

When the engine torque is transmitted to the starting clutch 39, as described above, if the accelerator pedal is not stepped on, the starting clutch 39 is controlled such that the connecting force thereof becomes a value small enough to be used as creep torque. As a result, the engine torque is transmitted to the driving wheels 5, 5 in a state reduced to be creep torque. In this process, similarly to the above, the flywheel device 1 damps torsional vibration and reduces torque variation. Particularly, the coefficient of kinetic friction of each of the friction discs 20, 21, the coefficient of viscosity of grease, and the spring modulus of each of the first coil springs 18a, 18a of the flywheel device 1 are set as described above, whereby when the starting clutch 39 is turned on, the resonance frequency of the rotational vibration system from the engine 2 to the driving wheels 5, 5 is made smaller than a range of values thereof corresponding to the region of the idling engine speed. Hence, it is possible to prevent occurrence of the resonance in the idle operating region of the engine.

On the other hand, when the accelerator pedal is stepped on, the starting clutch 39 is controlled such that the connecting force thereof is progressively increased. As a result, the vehicle is started smoothly, and as the vehicle speed is increased, the widths of the drive pulley 36 and driven pulley 37 are variably driven by the pulley width variable mechanism, whereby the gear ratio of the automatic transmission 3 is continuously or steplessly changed to a higher speed side. When the engine torque is transmitted to the driving wheels 5, 5 during travel of the vehicle, vibrations and noises in the vehicle compartment are reduced by the static torsional characteristics in the second stage, of the flywheel device 1.

Further, if the shift lever is moved by the driver to a reverse range when the engine 2 is idling in the standing state of the vehicle, the reverse brake 34 is turned on to lock the planetary carrier 32d, with the forward clutch 33 being in the OFF state. This causes torque of the input shaft 31 to be transmitted to the main shaft 35 by reversing the direction of rotation via the sun gear 32a of the planetary gear device 32, the planetary pinion gears 32b, and the ring gear 32c. In this transmission process, the sun gear 32a, the planetary pinion gears 32b, and the ring gear 32c are rotated at respective different speeds, so that tooth hitting sounds of the gears are more liable to be generated than when the shift lever is in the drive range. These tooth hitting sounds of the gears can be also reduced by reducing torque variations by means of the flywheel device 1.

As described above, according to the flywheel device 1, the mass ring 12 is centered with respect to the crankshaft 2a simply by fitting the annular recess 12a of the mass ring 12 in the annular projection 11b of the drive plate 11, and hence it is possible to center the mass ring 12 with ease and accuracy when the flywheel device 1 is attached to the crankshaft 2a. Particularly, since the mass ring 12 is made of cast iron, the annular recess 12a for centering the mass ring 12 can be formed easily and accurately by cutting the cast iron. Further, since cast iron has a relatively high specific gravity, the inertial mass required for the mass ring can be easily obtained.

Further, since a member corresponding to the conventional flywheel body is formed by assembling the two components of the mass ring 12 and the drive plate 11, it is possible to increase the freedom of arrangement thereof in comparison with the conventional flywheel body. Further, since the mass ring 12 is mounted on the outer peripheral portion of the drive plate 11, it is possible to reduce the total weight of the mass ring 12 and the drive plate 11, and secure an inertial mass and the moment of inertia for reducing torque variation, in a properly balanced manner. Furthermore, since there is no need to arrange a bearing as used in the conventional flywheel in the drive plate 11, it is possible to decrease the number of component parts.

Moreover, the large and small spring chambers 13b, 13d for accommodating the first to third coil springs 18a to 18c are provided on a radially inner side of the annular recess 12a of the mass ring 12, so that the annular recess 12a, and the large and small spring chambers 13b, 13d are prevented from being axially arranged side by side, thereby making it possible to make compact the whole device in axial size.

Although in the above embodiment, the mass ring 12 is formed of cast iron, this is not limitative, but any other suitable material may be employed to form the mass ring so long as an inertial mass can be easily obtained therefrom and it can be easily worked on. Further, the configuration for fitting the mass ring 12 in the drive plate 11 is not limited to the combination of the annular recess 12a and the annular projection 11b in the embodiment, but any suitable configuration or mechanism may be utilized so long as it is capable of centering the mass ring 12 with respect to the crankshaft 2a by fitting the mass ring 12 in the drive plate 11.

It is further understood by those skilled in the art that the foregoing is a preferred embodiment of the invention, and that various changes and modifications may be made without departing from the spirit and scope thereof.

What is claimed is:

1. A flywheel device for a prime mover, which is arranged between an output shaft and a driven shaft of the prime mover,
the flywheel device comprising:
a plate having a fitting portion in a radially outer portion thereof and mounted to the output shaft in a manner concentric therewith; and
an inertial mass member having an annular shape, said inertial mass member having a fitting portion which is fitted to the fitting portion of said plate, whereby said inertial mass member is concentrically attached to said plate, for transmitting torque from the prime mover to the driven shaft while reducing variation in the torque;
further comprising a linkage connecting between a portion of said inertial mass member radially inward of the fitting portion thereof and the driven shaft; and
a damping mechanism arranged in said linkage, for transmitting the torque from the prime mover to the driven shaft while damping torsional vibration thereof;
wherein said damping mechanism comprises at least one coil spring, and
wherein said linkage includes a pair of spring holder plates for holding said at least one coil spring in a spring chamber formed therebetween; and
wherein said damping mechanism further comprises a pair of friction discs, grease contained in the spring chamber and having a predetermined coefficient of viscosity, said at least one coil spring having a predetermined spring modulus, and
wherein the coefficient of viscosity of the grease and the spring modulus of each coil spring are selected such that a rotational vibration system including the prime mover and the driven shaft has a resonance frequency which is outside a range of values thereof corresponding to a predetermined rotational speed region of the prime mover.

2. The flywheel device according to claim 1, wherein said at least one coil spring comprises at least two kinds of coil springs arranged such that said at least two kinds of coil springs start to be compressed at respective relative rotational angles of the output shaft to the driven shaft.

3. The flywheel device according to claim 1, wherein said grease fills part of a volume of the spring chamber.

4. The flywheel device according to claim 1, wherein the pair of friction discs each has a predetermined coefficient of kinetic friction, and wherein the predetermined coefficient of kinetic friction of each friction disc is selected such that the rotational vibration system including the prime mover and the driven shaft has the resonance frequency which is outside the range of values thereof corresponding to the predetermined rotational speed region of the prime mover.

5. A flywheel device for a prime mover, which is arranged between an output shaft and a driven shaft of the prime mover,
the flywheel device comprising:
a plate having a fitting portion in a radially outer portion thereof and mounted to the output shaft in a manner concentric therewith; and
an inertial mass member having an annular shape, said inertial mass member having a fitting portion which is fitted to the fitting portion of said plate, whereby said inertial mass member is concentrically attached to said plate, for transmitting torque from the prime mover to the driven shaft while reducing variation in the torque;
wherein said damping mechanism comprises at least one coil spring,
wherein said linkage includes a pair of spring holder plates for holding said at least one coil spring in a spring chamber formed therebetween; and
wherein said at least one coil spring comprises at least two kinds of coil springs arranged such that said at least two kinds of coil springs start to be compressed at respective relative rotational angles of the output shaft to the driven shaft.

6. A flywheel device for a prime mover, which is arranged between an output shaft and a driven shaft of the prime mover,
the flywheel device comprising:
a plate having a fitting portion in a radially outer portion thereof and mounted to the output shaft in a manner concentric therewith;
an inertial mass member having an annular shape, said inertial mass member having a fitting portion which is fitted to the fitting portion of said plate, whereby said inertial mass member is concentrically attached to said plate, for transmitting torque from the prime mover to the driven shaft while reducing variation in the torque;

a pair of spring holder plates having respective spring-accommodating recesses and attached to said inertial mass member, said spring holder plates extending radially inward of the fitting portion of said inertial mass member in an opposed arrangement; and at least one coil spring accommodated and held between said spring-accommodating recesses of said spring holder plates, for transmitting the torque from the prime mover to the driven shaft while damping torsional vibration thereof.

7. The flywheel device according to claim 6, wherein said damping mechanism further comprises a pair of friction discs each having a predetermined coefficient of kinetic friction, grease contained in the spring chamber and having a predetermined coefficient of viscosity, said at least one coil spring having a predetermined spring modulus, and wherein the predetermined coefficient of kinetic friction of each friction disc, the coefficient of viscosity of the grease, and the spring modulus of each coil spring are selected such that a rotational vibration system including the prime mover and the driven shaft has a resonance frequency which is outside a range of values thereof corresponding to a predetermined rotational speed region of the prime mover.

8. The flywheel device according to claim 6, wherein said at least one coil spring comprises at least two kinds of coil springs arranged such that said at least two kinds of coil springs start to be compressed at respective relative rotational angles of the output shaft to the driven shaft.

9. The flywheel device according to claim 6, wherein said grease fills part of a volume of the spring chamber.

* * * * *